(12) United States Patent
Kishima et al.

(10) Patent No.: US 6,747,811 B2
(45) Date of Patent: Jun. 8, 2004

(54) OPTICAL SYSTEM, METHOD OF PRODUCING OPTICAL SYSTEM, AND OPTICAL PICKUP

(75) Inventors: Koichiro Kishima, Kanagawa (JP); Akira Kouchiyama, Kanagawa (JP)

(73) Assignee: Sony Corporation (JP)

( * ) Notice: Subject to any disclaimer, the term of this patent is extended or adjusted under 35 U.S.C. 154(b) by 123 days.

(21) Appl. No.: 09/940,938

(22) Filed: Aug. 29, 2001

(65) Prior Publication Data
US 2002/0036839 A1 Mar. 28, 2002

(30) Foreign Application Priority Data
Sep. 1, 2000 (JP) ..................... P2000-265274

(51) Int. Cl.⁷ ............................. G02B 13/18; G02B 3/02
(52) U.S. Cl. ........................................ 359/719; 359/794
(58) Field of Search ................................ 359/719, 736, 359/793–795, 796, 668

(56) References Cited
U.S. PATENT DOCUMENTS
4,662,717 A * 5/1987 Yamada et al. ............. 359/362
5,024,509 A * 6/1991 Kurihara ..................... 359/741
6,034,827 A * 3/2000 Nomura et al. ............. 359/811
2002/0109925 A1 * 8/2002 Miura ......................... 359/719

* cited by examiner

Primary Examiner—Jordan M. Schwartz
(74) Attorney, Agent, or Firm—Rader, Fishman & Grauer PLLC; Ronald P. Kananen

(57) ABSTRACT

An optical system capable of reducing trouble in assembly and skew adjustment, comprising first and second optical lenses arranged so that their optical axes coincide or substantially coincide, wherein the first optical lens has a substrate comprised of an optical material, the substrate has a convex portion serving as a convex lens, a flat portion positioned around the convex portion, and an outer circumference portion positioned around the flat portion, a thickness of the substrate at the outer circumference portion is greater than a thickness of the substrate at the convex portion, and the outer circumference portion of the first optical lens and that of the second optical lens are fixed in place by an adhesive so that the convex portion of the first optical lens faces the convex portion of the second optical lens.

18 Claims, 11 Drawing Sheets

OPTICAL SYSTEM, METHOD OF PRODUCING OPTICAL SYSTEM, AND OPTICAL PICKUP

BACKGROUND OF THE INVENTION

1. Field of the Invention

The present invention relates to an optical system having a plurality of optical elements, a method of producing the optical system, and an optical pickup having the optical system.

2. Description of the Related Art

In recent years, there has been a demand for optical storage media having a higher density. Therefore, research and development have been underway in optical disk apparatuses for shortening the wavelength of the light source and increasing the numerical aperture (NA) of the reproduction optical system. Also, there has been a demand for a higher transfer rate of data.

When shortening the wavelength of the light source and raising the numerical aperture (NA) of the reproduction optical system, the size of the optical spot becomes smaller and the depth of focus becomes shallower, so it is desirable to reduce the error in focal servo control. Further, the width of the optical storage medium on which data is stored (track width) becomes narrower, so it is desirable to reduce the error in tracking servo control.

Further, when raising the transfer rate of data, it is desirable to raise the range of the actuator performing the focal servo control and tracking servo control. As a result, two improvements in the servo control characteristics are desirable: to reduce the error and to improve the range. The actuator can be improved in servo control characteristics by reducing the weight of the actuator.

An optical system having a high NA of 0.85 can be formed by a two-group lens comprised of a combination of two optical lenses. Furthermore, a near field optical lens of an NA=1.5 can be formed.

However, reduction of the size of an optical system means that the curvature of the optical lenses becomes smaller, so the optical lenses are required to be highly precise. When constructing a two-group lens, the requirement of the accuracy of positioning the two optical lenses becomes severe.

FIG. 1 is a schematic view of the configuration of an example of an optical system comprised of a two-group lens.

The optical system 10 comprises optical lenses 1 and 6 and a lens holder 2.

The optical lens (front lens) 1 and optical lens 6 formed by glass molding are positioned and fixed in place via the lens holder 2. The lens holder 2 is prepared for example by resin molding or cutting etc.

The outer circumference portion 1C of the front lens is fit in a recess 2H of the lens holder 2. The outer circumference portion 1C of the front lens and the lens holder 2 are bonded together by an adhesive 4.

A circumferential wall 2C of the lens holder 2 and an outer circumference portion 6C of the optical lens 6 are bonded together by an adhesive 5.

The optical lens 6 is formed with a convex portion 6A on one surface and is formed with a convex portion 6B on the other surface. The convex portion 6B faces the convex portion 1A of the front lens 1.

In the optical system 10, the optical axis of the front lens 1 mounted in the lens holder 2 and an upper surface of the circumferential wall 2C of the lens holder 2 are not always vertical. Therefore, when producing (assembling) the optical system 10, it is necessary to adjust for the skew (adjust the optical axis) of the front lens 1 mounted in the lens holder 2 and the optical lens 6. A clearance necessary for the skew adjustment is provided between the lens holder 2 and the optical lens 6. The clearance is adjusted by the thickness of the adhesive 5.

Originally, it is desirable to increase the bonding area and reduce the thickness of an adhesive. However, in the optical system 10, the adhesive 5 is made a thickness more than necessary for bonding, so the amount of the adhesive 5 increases undesirably. Also, the adhesive 4 and 5 is used to bond a plurality of locations, so assembly of the optical system 10 is troublesome.

A front lens comprised of a glass material can be produced using glass molding by charging the glass material in a mold, then heating and/or pressing the mold. For the glass material, it is possible to use a spherical glass material because it is easy to adjust the volume and the material easily fills the mold.

However, with glass molding, it is difficult to make the outer circumference portion 1C large. Also, skew adjustment of the two-group lenses is complicated and troublesome because it is hard to make the outer circumference portion 1C large in the front lens 1 which has a small curvature of the convex portion 1A.

SUMMARY OF THE INVENTION

A first object of the present invention is to provide an optical system capable of reducing the trouble of assembly, a method of producing the optical system, and an optical pickup having the optical system.

A second object of the present invention is to provide an optical system capable of reducing the trouble in assembly and skew adjustment.

According to a first aspect of the present invention, there is provided an optical system comprising first and second optical lenses arranged so as to have coinciding or substantially coinciding optical axes, wherein the first optical lens has a substrate comprised of an optical material; the substrate has a convex portion serving as a convex lens and an outer circumference portion positioned around the convex portion; a thickness of the substrate at the outer circumference portion is greater than a thickness of the substrate at the convex portion; and the outer circumference portion of the first optical lens and the second optical lens are fixed in place so that the convex portion of the first optical lens faces the second optical lens.

Preferably, the outer circumference portion of the first optical lens faces the outer circumference portion of the second optical lens; and a facing surface of the outer circumference portion of the first optical lens and a facing surface of the outer circumference portion of the second optical lens are flat or approximately flat.

More preferably, a facing surface of the outer circumference portion of the first optical lens is vertical or substantially vertical with respect to an optical axis of the first optical lens; a facing surface of the outer circumference portion of the second optical lens is vertical or substantially vertical with respect to an optical axis of the second optical lens; and a facing surface of the outer circumference portion of the first optical lens and a facing surface of the outer circumference portion of the second optical lens are bonded together.

Preferably, the outer circumference portion is positioned around the flat portion; and a thickness of the substrate at the outer circumference portion is greater than a thickness of the substrate at the flat portion.

Preferably, the outer circumference portion of the first optical lens and the second optical lens are bonded via an intermediate member so that the convex portion of the first optical lens faces the second optical lens.

Preferably, the second optical lens has a first convex portion on one surface, a second convex portion on the other surface opposing the one surface, and an outer circumference portion positioned around the first and second convex portions, and center axes of the first and second convex portions coinciding or substantially coinciding; and the outer circumference portion of the second optical lens and the outer circumference portion of the first optical lens are fixed in place.

According to a second aspect of the present invention, there is provided a method of producing an optical system having first and second optical lenses, wherein the first optical lens has a substrate comprised of an optical material; and the substrate has a convex portion serving as a convex lens and an outer circumference portion positioned around the convex portion, a thickness of the substrate at the outer circumference portion being greater than a thickness of the substrate at the convex portion; comprising the step of bonding together the outer circumference portion of the first optical lens and the second optical lens so that optical axes of the first and second optical lenses coincide or substantially coincide.

Preferably, the method further includes the step of mounting the outer circumference portion of the second optical lens on the outer circumference portion of the first optical lens and positioning the first and second optical lenses so that the optical axes coincide or substantially coincide; a mounting surface of the outer circumference portion of the first optical lens being flat or approximately flat; and a bottom surface of the outer circumference portion of the second optical lens being flat or approximately flat.

More preferably, the mounting surface of the outer circumference portion of the first optical lens is vertical or substantially vertical with respect to the optical axis of the first optical lens; and the bottom surface of the outer circumference portion of the second optical lens is vertical or substantially vertical with respect to the optical axis of the second optical lens.

Preferably, the first optical lens further comprises a flat portion positioned around the convex portion; the outer circumference portion of the first optical lens is positioned around the flat portion; and a thickness of the substrate at the outer circumference portion of the first optical lens is greater than a thickness of the substrate at the flat portion.

For example, the outer circumference portion of the first optical lens and the second optical lens are bonded via an intermediate member so that the optical axes of the first and second optical lenses coincide or substantially coincide.

For example, the second optical lens has a first convex portion on one surface, a second convex portion on the other surface opposing the one surface, and the outer circumference portion positioned around the first and second convex portions and center axes of the first and second convex portions coinciding or substantially coinciding.

According to a third aspect of the present invention, there is provided an optical pickup comprising a laser; an optical system for focusing laser light from the laser on an optical disk; and a photodetector for receiving the laser light reflected at the optical disk; wherein the optical system comprises first and second optical lenses arranged so that their optical axes coincide or substantially coincide; the second optical lens passes the laser light from the laser and supplies it to the first optical lens; the first optical lens has a substrate comprised of an optical material; the substrate has a convex portion for focusing laser light from second optical lens on the optical disk and an outer circumference portion positioned around the convex portion; a thickness of the substrate at the outer circumference portion is greater than a thickness of the substrate at the convex portion; and the outer circumference portion of the first optical lens and the second optical lens are fixed in place so that the convex portion of the first optical lens faces the second optical lens.

Preferably, the outer circumference portion of the first optical lens faces the outer circumference portion of the second optical lens; and a facing surface of the outer circumference portion of the first optical lens and a facing surface of the outer circumference portion of the second optical lens are flat or approximately flat.

More preferably, a facing surface of the outer circumference portion of the first optical lens is vertical or substantially vertical with respect to the optical axis of the first optical lens; a facing surface of the outer circumference portion of the second optical lens is vertical or substantially vertical with respect to the optical axis of the second optical lens; and the facing surface of the outer circumference portion of the first optical lens and the facing surface of the outer circumference portion of the first optical lens are bonded together.

Preferably, the first optical lens further comprises a flat portion positioned around the convex portion; the outer circumference portion is positioned around the flat portion; and a thickness of the substrate at the outer circumference portion is greater than a thickness of the substrate at the flat portion.

For example, the outer circumference portion of the first optical lens and the second optical lens are bonded via an intermediate member so that the convex portion of the first optical lens faces the second optical lens.

For example, the second optical lens has a first convex portion on one surface, a second convex portion on the other surface opposing the one surface and an outer circumference portion positioned around the first and second convex portions, and center axes of the first and second convex portions coinciding or substantially coinciding, and the outer circumference portion of the second optical lens and an outer circumference portion of the first optical lens are bonded together.

In short, the substrate of the first optical lens has a convex portion serving as a convex lens and an outer circumference portion arranged around the convex portion. The thickness of the outer circumference portion of the substrate is greater than that of the convex portion of the substrate.

By fixing the outer circumference portion of the first optical lens and the second optical lens so that the convex portion of the first optical lens faces the second optical lens, the trouble in assembling the optical system can be reduced comparing with the case where a convex lens is bonded to the lens holder and the lens holder is fixed to the second optical lens. Also, an optical system having a high NA can be obtained.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Below, embodiments of the present invention will be explained with reference to the attached drawings.

First Embodiment of Optical System

Figure 2:
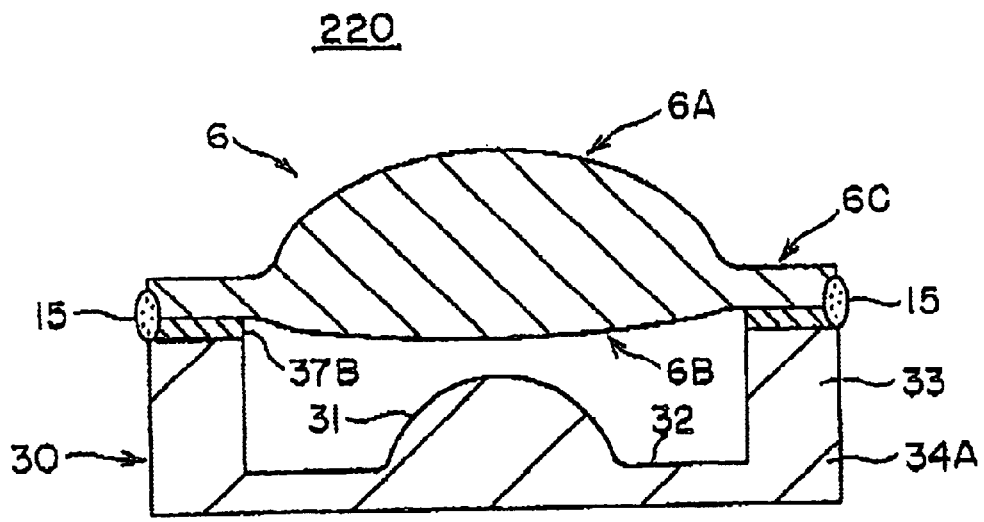
FIG. 2 is a schematic view of the configuration of a first embodiment of an optical system according to the present invention.

FIG. 2 is a schematic view of the configuration of a first embodiment of an optical system according to the present invention. The optical system 220 is comprised of a two-group lens and has optical lenses 6 and 30.

The optical lens 6 formed by glass molding and the optical lens (front lens) 30 formed by a later explained etching are positioned and fixed in place.

The optical lenses 6 and 30 are both circular shaped and have cross-sections as shown in the figure.

The front lens 30 has a substrate 34A made of an optical material. The substrate 34A has a convex portion 31 having the function of a convex lens, a flat portion 32 positioned around the convex portion 31, and an outer circumference portion 33 positioned around the flat portion 32.

The thickness of the substrate 34A at the outer circumference portion is greater than that of the substrate 34A at the flat portion 32. Also, the thickness of the substrate 34A at the outer circumference portion 33 is greater than that of the substrate 34A at the convex portion 31.

On the upper surface (mounting surface) of the outer circumference portion 33 of the front lens 30 is formed a mask layer 37B comprised of an inorganic material.

The optical lens 6 has a convex portion 6A on one surface, a convex portion 6B on the other surface opposing that one surface, and an outer circumference portion 6C positioned around the convex portions 6A and 6B. The optical axes of the convex portions 6A and 6B coincide, while the diameters of outer circumferences of the convex portions 6A and 6B are the same or approximately the same. The upper surface and lower surface of the outer circumference portion 6C are flat and vertical or substantially vertical with respect to the optical axes of the convex portions 6A and 6B.

The bottom surface of the outer circumference portion 6C of the optical lens 6 faces the upper surface of the outer circumference portion 33 of the front lens 30. The mask layer 37B of the outer circumference portion 33 of the front lens 30 and the outer circumference portion 6C are bonded together by an adhesive 15.

In the optical system 220, the convex portion 6B of the optical lens 6 faces the convex portion 31 of the front lens 30, and the optical axis of the optical lens 6 and the optical axis of the convex portion 31 coincide or substantially coincide.

The rim of the outer circumference portion 33 of the front lens 30 and that of the outer circumference portion 6C of the optical lens 6 coincide or substantially coincide.

The upper surface (surface facing the outer circumference portion 6C of the optical lens 6) of the outer circumference portion 33 of the front lens 30 is flat or substantially flat. The facing surface is vertical with respect to the optical axis of the convex lens comprised of the convex portion 31.

Accordingly, the facing surface can be used as a reference for skew adjustment when positioning the optical lens 6 and the front lens 30 and the clearance for the slew adjustment can be made smaller. As a result, the thickness of the adhesive 15 can be reduced when bonding the optical lens 6 and the front lens 30 and the mechanical strength and reliability can be improved.

Also, in the skew adjustment of the optical system 220, since the outer circumference portion 33 of the front lens 30 is thicker than the convex portion 31, a reference for the skew can be obtained by making the facing surface abut against a reference plane.

Furthermore, by arranging the flat surface of the outer circumference portion 6C of the optical lens 6 on the facing surface of the outer circumference portion 33 of the front lens 30, the optical lenses 6 and 30 can be positioned in a plane vertical to the optical axis. Skew adjustment is therefore made easier than when positioning in three dimensions. By bonding together the flat surface of the outer circumference portion 6C and the facing surface of the outer circumference portion 33, the bonding area can be enlarged.

Figure 1:
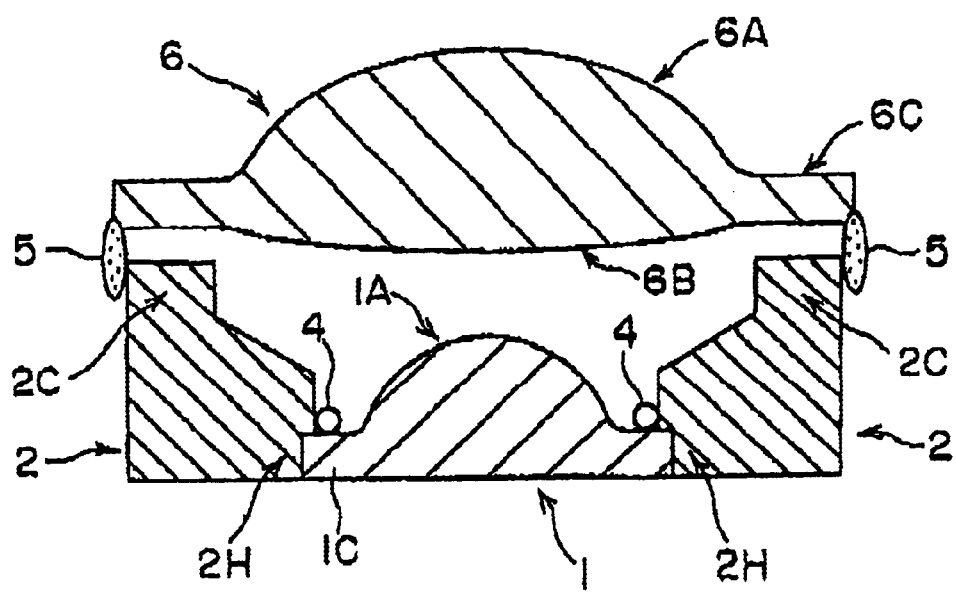
FIG. 1 is a schematic view of the configuration of an example of an optical system for comparison with the present invention.

Also, since the optical system 220 in FIG. 2 has fewer bonding locations compared with the optical system 10 in FIG. 1, the trouble in assembly can be reduced and the production process (assembly process) can be made simpler.

Note that the optical lens 6 is formed by glass molding and that the outer circumference portion 6C of the optical lens 6 is configured to be thinner than the convex portions 6A and 6B.

For example, the diameter of the convex portion 31 may be made about 200 $\mu$m, the height from the top of the convex portion 31 to the upper surface of the outer circumference portion 33 may be made about 150 $\mu$m, and a distance from the top of the convex portion 31 to the convex portion 6B may be made 90 $\mu$m.

Second Embodiment of Optical System

Figure 3:
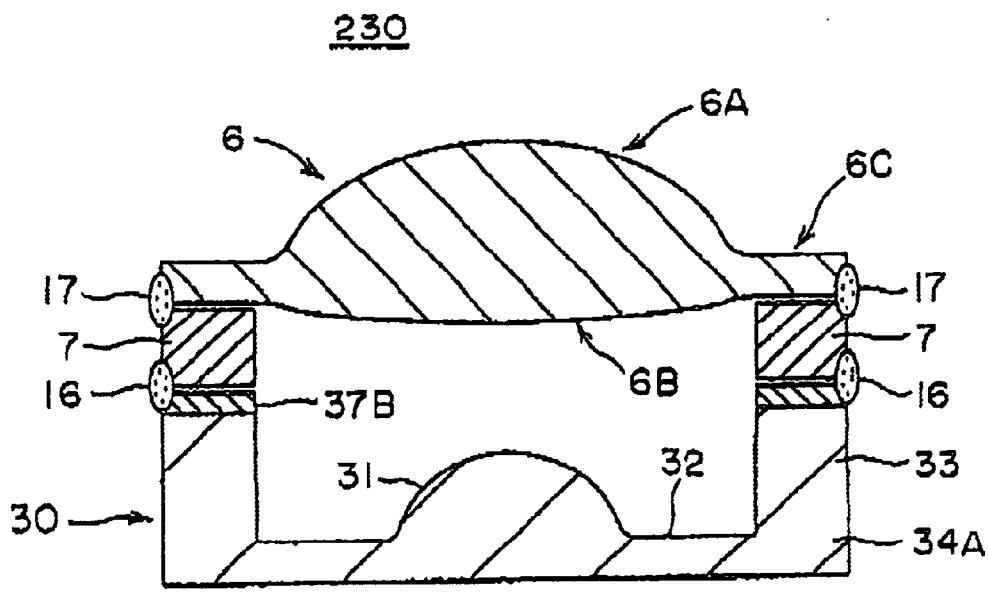
FIG. 3 is a schematic view of the configuration of a second embodiment of an optical system according to the present invention.

FIG. 3 is a schematic view of the configuration of a second embodiment of an optical system according to the present invention. The optical system 230 is comprised of a two-group lens and has optical lenses 6 and 30 and a ring-shaped intermediate member 7. Note that in the optical system 230 in FIG. 3, the same reference numbers are assigned to the same components as those in the optical system 220 in FIG. 2 and an explanation of the same components are omitted. The shape of the intermediate member 7 is circular like the optical lenses 6 and 30. Its cross-section is shown in the figure.

A ring-shaped intermediate member 7 is arranged between the outer circumference portion 6C of the optical lens 6 and the outer circumference portion 33 of the front lens 30.

A bottom surface of the outer circumference portion 6C of the optical lens 6 faces an upper surface of the ring-shaped intermediate member 7, and the outer circumference portion 6C and the intermediate member 7 are fixed in place by an adhesive 17.

A mask layer 37B of the outer circumference portion 33 of the front lens 30 faces the lower surface of the ring-shaped intermediate member 7, and the mask layer 37B and the intermediate member 7 are fixed in place by an adhesive 16.

A convex portion 6B of the optical lens 6 opposes a convex portion 31 of the front lens 30. An optical axis of the optical lens 6 and an optical axis of the convex portion 31 coincide or substantially coincide.

The rim of the outer circumference portion 33 of the front lens 30 and the rim of the intermediate member 7 coincide or substantially coincide with the rim of the outer circumference portion 6C of the optical lens 6. Also, the thickness of the intermediate member 7 is constant.

The upper surface (surface facing the member 7) of the outer circumference portion 33 of the front lens 30 is flat or substantially flat. The facing surface is vertical with respect to the optical axis of the convex lens formed by a convex portion 31.

Accordingly, when positioning the optical lens 6 and the front lens 30, the facing surface can be used as a reference for skew adjustment and the clearance for skew adjustment can be made smaller. As a result, the thickness of the adhesive 16 and 17 can be reduced at the time of bonding the optical lens 6 and the front lens 30.

Also, in skew adjustment of the optical system 230, since the outer circumference portion 33 of the front lens is thicker than the convex portion 31, a reference for the skew can be obtained by making the facing surface abut against a reference plane.

Furthermore, by arranging the flat surface of the outer circumference portion 6C of the optical lens 6 on the facing surface of the outer circumference portion 33 of the front lens 30 via the intermediate member 7, the optical lenses 6 and 30 can be positioned within a plane vertical to the optical axis. Therefore, skew adjustment can be made easier compared with the case of positioning in three dimensions. By bonding the flat surface of the outer circumference portion 6C and the facing surface of the outer circumference portion 33 via the intermediate member 7, the bonding area can be made larger.

Production Method of Optical Lens

Next, the method of producing the optical lens will be explained.

FIGS. 4A to 4C and FIGS. 5A to 5B are views for explaining a method of producing the optical lens 30 in FIG. 2 and FIG. 3.

Figure 4A:
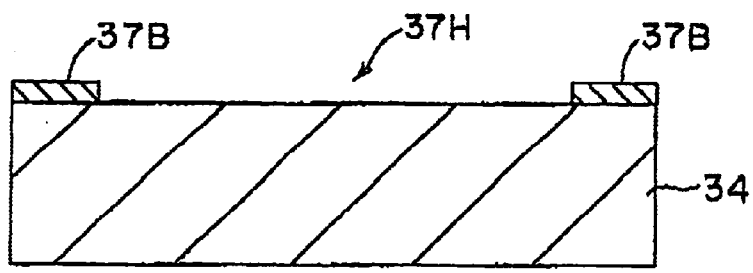
FIGS. 4A to 4C are views for explaining a method of producing an optical lens in FIG. 2 and FIG. 3.

In FIG. 4A, a substrate 34 comprised of an optical material is formed with a second mask layer 37B having an opening 37H. The second mask layer 37B is comprised of an etching-resistant material and has a thickness of for example about 0.1 $\mu$m. The second mask layer 37B may be comprised of an inorganic material such as platinum or a hard mask.

Figure 4B:
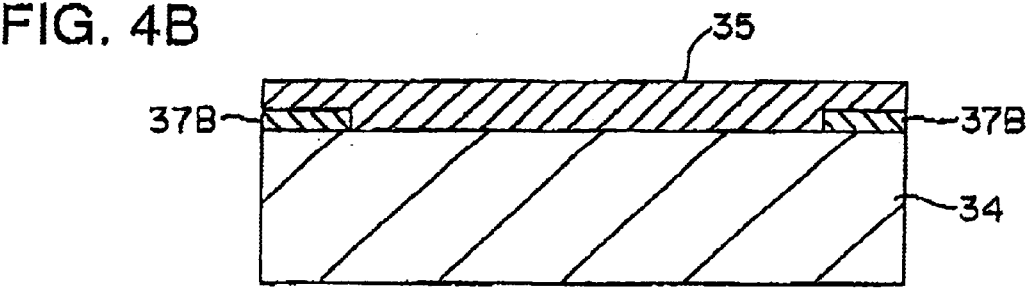

In FIG. 4B, a mask material 35 is coated on the substrate 34 of FIG. 4A. The mask material 35 is for example comprised of a photosensitive material (or photo-resist) and coated to a predetermined thickness by spin coating etc. The thickness of the mask material 35 is for example about 25 $\mu$m.

Figure 4C:
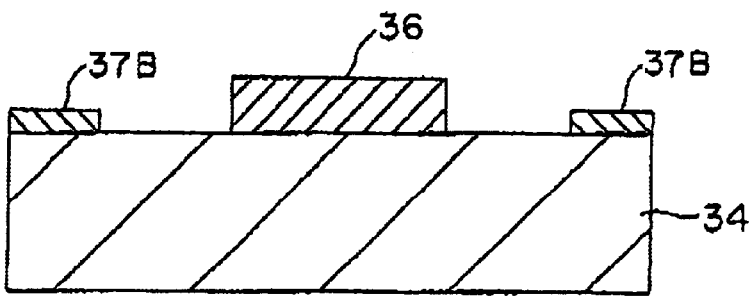

In FIG. 4C, the mask material 35 on the substrate 34 of FIG. 4B is patterned to form a first mask layer 36 and expose the second mask layer 37B. The first mask layer 36 is formed at the opening 37H shown in FIG. 4A. The mask material 35 is patterned for example by exposure and development. The diameter of the first mask layer 36 is for example made about 100 $\mu$m to about 250 $\mu$m.

Figure 5A:
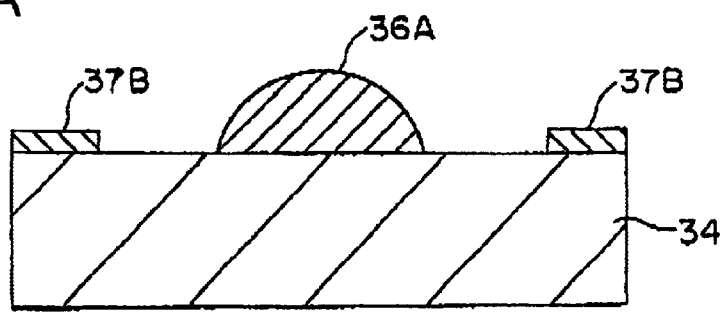
FIGS. 5A and 5B are views for explaining a method of producing the optical lens in FIG. 2 and FIG. 3 continuing from FIG. 4C.

In FIG. 5A, the substrate 34 (or mask layer 36A on substrate 34) of FIG. 4C is heat treated to make it deform so that the surface area of the mask layer 36A becomes smaller due to surface tension etc. and make it deform to a convex shape having a gentle curve.

The mask layer 36 in FIG. 4C becomes the mask layer 36A in FIG. 5A by the heat treatment. The mask layer 36A has a round convex shape (shape of a convex lens).

Figure 5B:
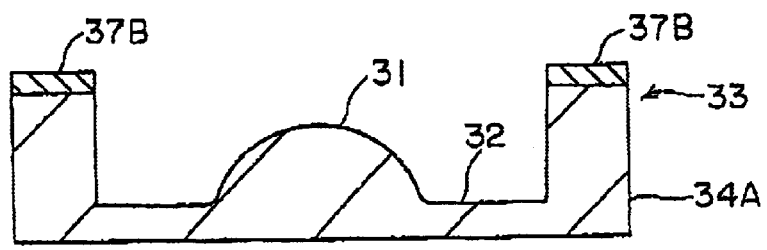

In FIG. 5B, the shape of the mask layer 36A of FIG. 5A is transferred to the substrate 34 to form a substrate 34A and form the optical lens 30. For example, the shape of the mask layer 36A is transferred to the substrate 34 by reactive ion etching (RIE) or other etching to form the optical lens 30.

The convex portion 31 is formed by transfer of the mask layer 36A, and the flat portion 32 is formed by transfer of the shape between the mask layers 36A and 37B. The outer circumference portion 33 is masked by the mask layer 37B and is not etched.

Note that the substrate 34A may be formed with a groove called a "trench" around the convex portion 31 by transfer etching. The groove clearly delineates the convex portion 31 and the flat portion 32.

The etching for forming the convex portion 31 is performed for example by a plasma etching apparatus using a high density plasma source such as a magnetic neutral loop discharge plasma (NLD) apparatus. Note that H. Tsuboi, M. Itoh, M. Tanabe, T. Hayashi, and T. Uchida, *Jpn. J. Appl. Phys.* 34 (1995) 2476, may be referred to regarding an NLD apparatus.

Alternately, the processing is performed by a plasma etching apparatus using a high density plasma source such as an inductively coupled plasma (IPC) apparatus. Note that J. Hopwood, "Plasma Source", *Sci. & Technol.* 1 (1992), 109, and T. Fukasawa, A. Nakamura, H. Shindo, and Y. Horiike, *Jpn. J. Appl. Phys.* 33 (1994), 2139 may be referred to regarding an IPC apparatus.

According to the production method shown in FIGS. 4A to 4C and FIGS. 5A and 5B, a thick outer circumference portion 33 can be formed along with the formation of a convex portion 31 having the function of a convex lens.

Further, the optical lens 30 has a thick circumferential portion 33 formed around the flat portion 32. By using the production method shown in FIGS. 4A to 4C and FIGS. 5A and 5B, an optical lens having a shape hard to form by glass molding can be prepared.

Furthermore, the optical axis of the convex lens comprised of the convex portion 31 can be easily made vertical with respect to the upper surface of the mask layer 37B of the outer circumference portion 33.

Also, since the thickness of the outer circumference portion 33 can be made greater than that of the convex portion 31, the mechanical strength of the optical lens 30 can be improved, the resonance frequency of vibration in the thickness direction can be made higher, and the structure can be made resistant to resonance.

Note that the second mask layer 37B of FIG. 4A can be formed by the lift-off method etc. The step of forming it requires use of a resist remover etc., so when the mask material 35 is an organic material such as a photosensitive material, the step of forming the second mask layer 37B is preferably before the step of forming the mask material 35.

Also, since the second mask layer 37B is preferably not processed in the step of forming the substrate 34A of FIG. 5B, RIE using a chemical reaction is more preferable than ion milling as the step of FIG. 5B.

In the production method of FIGS. 4A to 4C and FIGS. 5A and 5B, as an example, a material having a glass transition temperature (Tg point) of about 45 to 55° C. is used as the mask material 35, and the heat treatment is performed in a temperature range of about 110° C. to about 150° C.

Also, since the first mask layer 36 is heat treated to make it deform round to a degree giving an optically smooth surface, the material of the mask material 35 is made a material having a Tg point lower than the temperature in the heat treatment.

Furthermore, when shaping the first mask layer 36 on the substrate 34 by dry etching etc., it is necessary that the mask layer 36A after the heat treatment not change in quality, so the temperature of the heat treatment is made a temperature not changing the mask layer 36A. For example, the temperature of the heat treatment is made a temperature lower than the carbonization temperature of the mask layer 36.

If the mask layer 36 deforms in a state of storage of the substrate 34 formed with the mask layers 36 and 37B, reproduction (reproducibility) of the process becomes difficult. Also, if the mask layers 36 and 37A deform in the dry etching process, reproduction of the process becomes difficult.

Accordingly, the material of the mask material 35 is made a material having a Tg point higher than a storage temperature (room temperature or ordinary temperature) or a processing temperature (near room temperature or near ordinary temperature).

Generally, the "Tg point" is the temperature indicating a boundary where a material becomes a glass state (that is, becomes fluid without taking on a certain structure), so when considering the stability of the process, the temperature of the heat treatment is preferably a temperature sufficiently higher than the Tg point.

Namely, to make the mask layer 36 deform to have a smaller surface area by the heat treatment (to make the mask layer 36 fluid by heat treatment and make the mask layer 36 deform by surface tension), the temperature of the heat treatment is preferably higher than the Tg point by several tens of °C.

As an example, by making the temperature of the heat treatment higher than the Tg point by at least about 40° C., the mask layer 36 can be made to deform round within one hour and the optical lens 30 can be efficiently produced.

Note that from the same point of view, in the relationship of the storage temperature or processing temperature and the Tg point, the difference between the storage temperature or processing temperature and the Tg point may be set to be within several tens of °C.

Figure 6A:
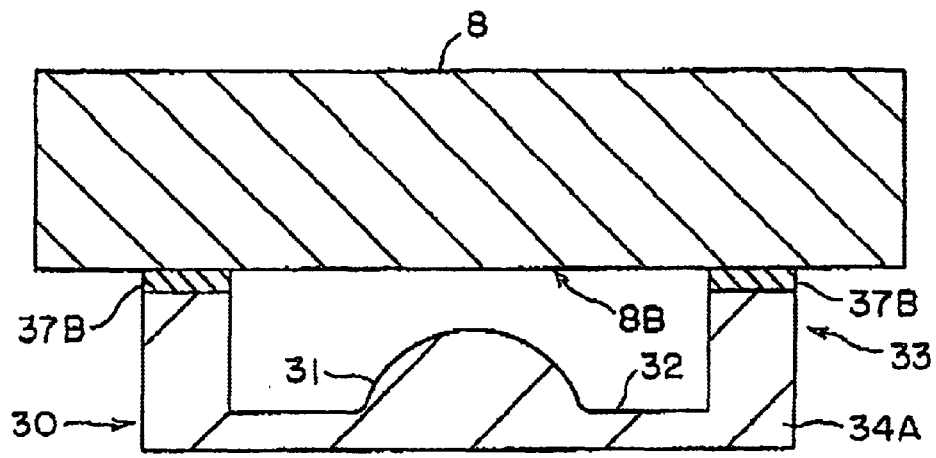
FIGS. 6A and 6B are views for explaining inspection of accuracy of the optical lens in FIG. 2 and FIG. 3.
Figure 6B:
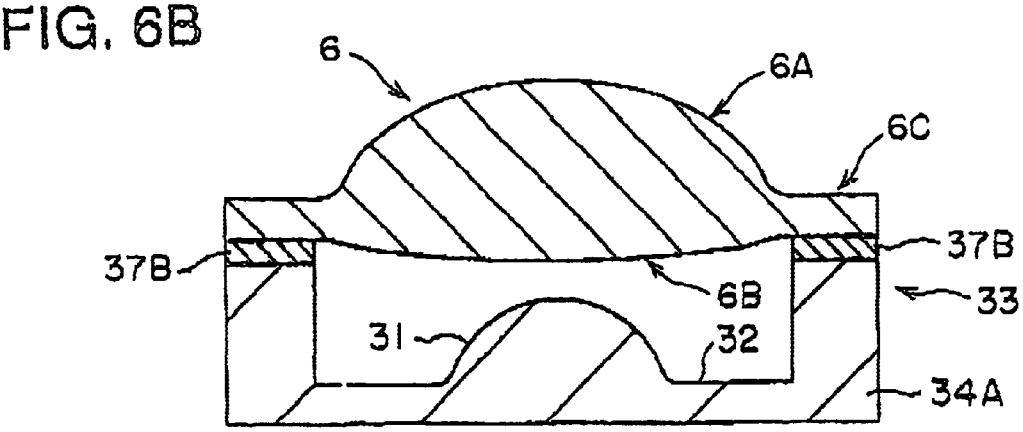

FIGS. 6A and 6B are views for explaining inspection of accuracy of the optical lens 30.

In FIG. 6A, the mask layer 37B of the outer circumference portion 33 of the optical lens 30 is made to abut against the bottom surface 8B of the member 8. The bottom surface 8B is used as a reference flat surface.

By detecting whether or not the overall area of the upper surface of the mask layer 37B contacts the bottom surface 8B, it is possible to detect whether the overall area of the upper surface of the outer circumference portion 33 is flat and to detect whether the height of the outer circumference portion 33 is constant. Consequently, it is possible to detect whether the upper surface of the outer circumference portion 33 is vertical with respect to the optical axis of the convex lens comprised of the convex portion 31. This can be used for skew adjustment.

In FIG. 6B, the mask layer 37B of the outer circumference portion 33 of the optical lens 30 is made to abut against the bottom surface CC of the optical lens 6. The bottom surface of the outer circumference portion 6C is used as a reference flat surface.

By detecting whether or not the overall area of the upper surface of the mask layer 37B contacts the bottom surface of the outer circumference portion 6C, it is possible to detect whether the upper surface of the outer circumference portion 33 is flat and to detect whether the height of the outer circumference portion 33 is constant. Consequently, it is possible to detect whether the upper surface of the outer circumference portion 33 is vertical with respect to the optical axis of the convex lens comprised of the convex portion 31. This can be used for skew adjustment. Also, skew adjustment is possible and becomes easier by moving the optical lens 6 within the plane vertical to the optical axis.

Third Embodiment of Optical System

Figure 7:
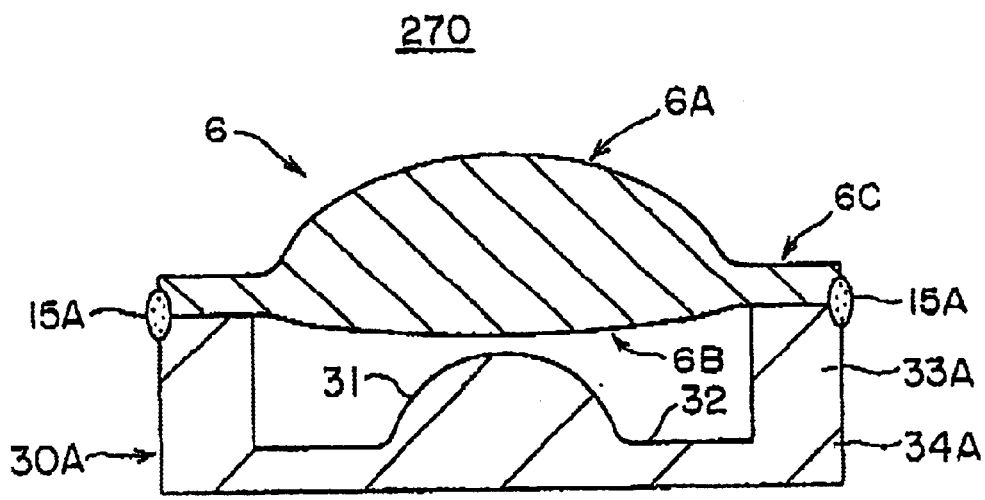
FIG. 7 is a schematic view of the configuration of a third embodiment of an optical system according to the present invention.

FIG. 7 is a schematic view of the configuration of a third embodiment of an optical system according to the present invention. The optical system 270 is comprised of a two-group lens and has optical lenses 6 and 30A.

The optical lens 6 formed by glass molding and the optical lens (front lens) 30A obtained by removing the mask layer 37B from the optical lens 30 are positioned and fixed in place. Note that in FIG. 7, the same reference numbers are assigned to the same components as those in FIG. 2 and FIG. 3 and an explanation of the same components will be omitted. The optical lenses 6 and 30A are both circular shaped and have cross-sections as shown in the figure.

The front lens 30A has a substrate 34A comprised of an optical material. The substrate 34A has a convex portion 31 having the function of a convex lens, a flat portion 32 positioned around the convex portion 31, and an outer circumference portion 33A arranged around the flat portion 32.

The thickness of the substrate 34A at the outer circumference portion 33A is greater than that at the flat portion 32. Also, the thickness of the substrate 34A at the outer circumference portion 33A is greater than that at the convex portion 31.

The bottom surface of the outer circumference portion 6C of the optical lens 6 faces the upper surface of the outer circumference portion 33A of the front lens 30A. The outer circumference portion 33A of the front lens 30A and the outer circumference portion 6C of the optical lens 6 are bonded together by an adhesive 15A.

The convex portion 6B of the optical lens 6 faces the convex portion 31 of the front lens 30A. The optical axis of the optical lens 6 and that of the convex portion 31 coincide or substantially coincide.

The rim of the outer circumference portion 33A of the front lens 30A and the rim of the 6C of the optical lens 6 coincide or substantially coincide.

The upper surface (surface facing the outer circumference portion 6C of the optical lens 6) of the outer circumference portion 33A of the front lens 30A is flat or substantially flat. The facing surface (mounting surface) is vertical with respect to the optical axis of the convex lens comprised of the convex portion 31.

Accordingly, when positioning the optical lens 6 and the front lens 30A, the facing surface can be used as a reference for skew adjustment and the clearance for the skew adjustment can be made smaller. Consequently, when bonding the optical lens 6 and the front lens 30A, the thickness of the adhesive 15A can be made smaller and the mechanical strength and reliability of the optical system 270 can be improved.

Also, in skew adjustment of the optical system 270, since the outer circumference portion 33A of the front lens 30A is thicker than the convex portion 31, a reference for the skew can be obtained by making the facing surface abut against the reference plane.

Furthermore, by arranging the flat surface of the outer circumference portion 6C of the optical lens 6 on the facing surface of the outer circumference portion 33A of the front lens 30A, the optical lenses 6 and 30A can be positioned within a plane vertical to the optical axis and the skew adjustment can be made easier comparing with the case of positioning in three dimensions. By bonding the flat surface of the outer circumference portion 6C and the facing surface of the outer circumference portion 33A, the bonding area can be made larger.

Also, since the optical system 270 in FIG. 7 has less bonding locations compared with the optical system 10 in FIG. 1, the trouble in assembly can be reduced and the production process becomes simpler.

Fourth Embodiment of Optical System

Figure 8:
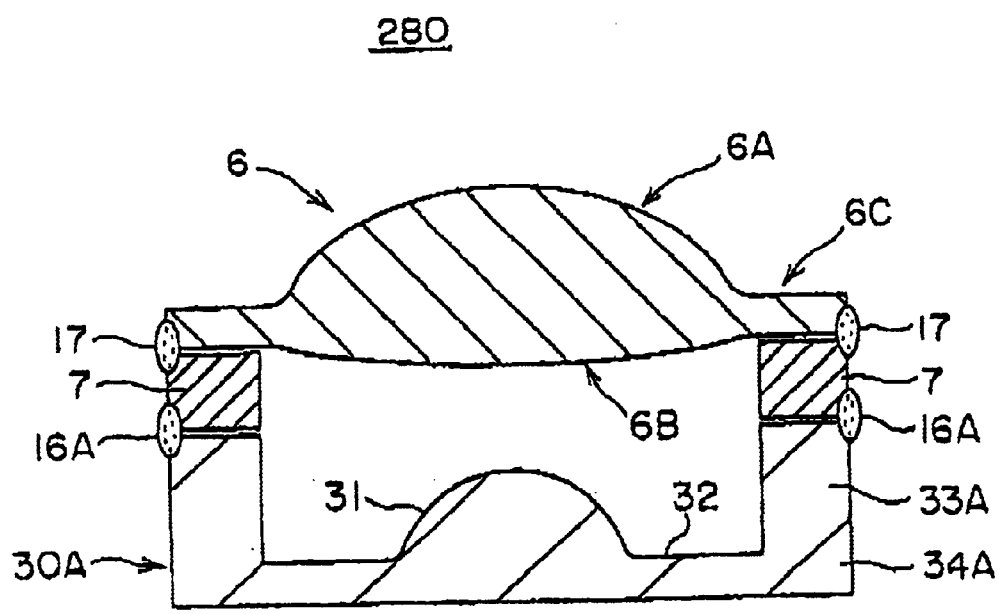
FIG. 8 is a schematic view of the configuration of a fourth embodiment of an optical system according to the present invention.

FIG. 8 is a schematic view of the configuration of a fourth embodiment of an optical system according to the present invention. The optical system 280 is comprised of a two-group lens and has optical lenses 6 and 30A and a ring-shaped intermediate member 7. Note that in the optical system 280 in FIG. 8, the same reference numbers are assigned to same components as those in the optical system 270 in FIG. 7, and an explanation of the same components will be omitted. The shape of the intermediate member 7 is circular in the same way as the optical lenses 7 and 30A and has a cross-section as shown in the figure.

The ring-shaped intermediate member 7 is arranged between the outer circumference portion 6C of the optical lens 6 and the outer circumference portion 33A of the front lens 30A.

The bottom surface of the outer circumference portion 6C of the optical lens 6 faces the upper surface of the ring-shaped intermediate member 7. The outer circumference portion 6C and the member 7 are bonded together by an adhesive 17.

The upper surface of the outer circumference portion 33A of the front lens 30A faces the lower surface of the ring-shaped member 7. The outer circumference portion 33A and the member 7 are bonded together by an adhesive 16A.

The convex portion 6B of the optical lens 6 faces the convex portion 31 of the front lens 30A. The optical axis of the optical lens 6 and that of the convex portion 31 coincide or substantially coincide.

The rim of the outer circumference portion 33A of the front lens 30A and the rim of the intermediate member 7 coincide or substantially coincide with the rim of the outer circumference portion 6C of the optical lens 6. Also, the thickness of the intermediate member 7 is constant.

The upper surface (surface facing the member 7) of the outer circumference portion 33A of the front lens 30A is flat or substantially flat. The facing surface is vertical with respect to the optical axis of the convex lens comprised of the convex portion 31.

Accordingly, when positioning the optical lens 6 and the front lens 30A, the facing surface can be used as a reference for skew adjustment and the clearance for the skew adjustment can be made smaller. Consequently, when bonding the optical lens 6 and the front lens 30A, the thickness of the adhesive 16A and 17 can be reduced and the mechanical strength of the optical system 280 can be improved.

Also, in skew adjustment in the optical system 280, since the outer circumference portion 33A of the front lens 30A is thicker than the convex portion 31, a reference for the skew can be obtained by making the facing surface abut against the reference plane.

Figure 9A:
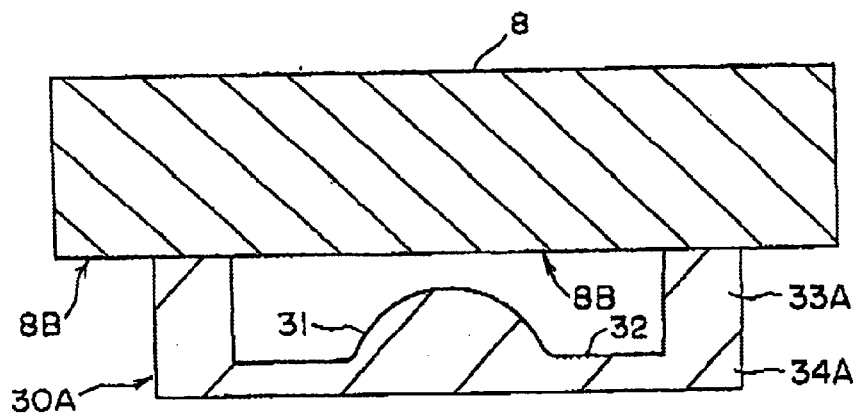
FIGS. 9A and 9B are views for explaining inspection of accuracy of an optical lens in FIG. 7 and FIG. 8.
Figure 9B:
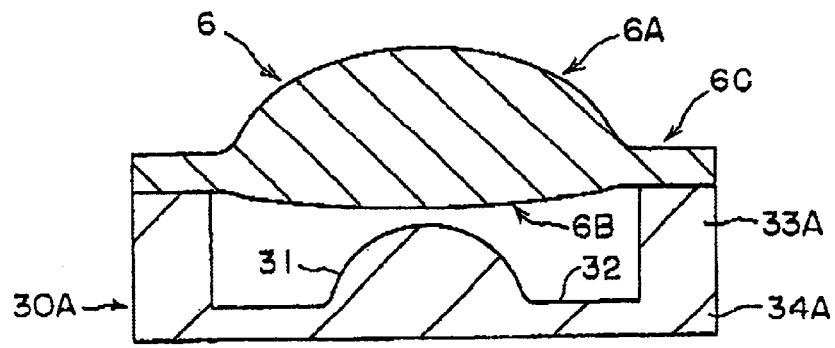

FIGS. 9A and 9B are views for explaining inspection of accuracy of the optical lens 30A.

In FIG. 9A, the upper surface of the outer circumference portion 33A of the optical lens 30A is made to abut against the bottom surface 8B of the member 8. The bottom 8B is used as a reference plane.

By detecting whether the overall upper surface of the outer circumference portion 33A contacts the bottom surface 8B, it is possible to detect whether the upper surface of the outer circumference portion 33A is flat and to detect whether the height of the outer circumference portion 33A is constant. As a result, it is possible to detect whether or not the upper surface of the outer circumference portion 33A is vertical with respect to the optical axis of the convex lens comprised of the convex portion 31. This can be used for skew adjustment.

In FIG. 9B, the upper surface of the outer circumference portion 33A of the optical lens 30A is made to abut against the bottom surface of the outer circumference portion 6C of the optical lens 6. The bottom surface of the outer circumference portion 6C is used as a reference flat surface.

By detecting whether or not the overall upper surface of the outer circumference portion 33A contacts the bottom surface of the outer circumference portion 6C, it is possible to detect whether the upper surface of the outer circumference portion 33A is flat and to detect whether the height of the outer circumference portion 33A is constant. As a result, it is possible to detect whether the upper surface of the outer circumference portion 33A is vertical with respect to the optical axis of the convex lens comprised of the convex portion 31. This can be used for the skew adjustment.

As explained above, the optical systems 220, 230, 270, and 280 are configured of combinations of two optical lenses. The outer circumference portion 33 and outer circumference portion 33A of the optical lenses 30 and 30A are thicker than the convex portion 31, so it is possible to prevent the optical lens 6 and the convex portion 31 from contact or friction.

Also, the upper surfaces of the outer circumference portion 33 and outer circumference portion 33A of the optical lenses 30 and 30A are flat or approximately flat, and the upper surfaces are vertical with respect to the optical axis of the convex lens comprised of the convex portion 31, so when positioning the optical lens 6 and the front lenses 30 and 30A, the upper surfaces can be used as references for skew adjustment and the clearance for skew adjustment can be made smaller.

As a result, when bonding the optical lens 6 and the front lenses 30 and 30A, the adhesive can be made thinner and the mechanical strength can be made greater.

Also, since the outer circumference portion 33 and outer circumference portion 33A are thicker than the convex portion 31, a reference for the skew can be obtained by making the upper surfaces of the outer circumference portion 33 and outer circumference portion 33A abut against the reference plane.

Furthermore, by arranging the flat bottom surface of the outer circumference portion 6C of the optical lens 6 on the facing surfaces of the outer circumference portion 33 and outer circumference portion 33A of the front lenses 30 and 30A, the optical lenses 6, 30, and 30A can be positioned in a plane vertical to the optical axis and the skew adjustment can be made easier compared with the case of positioning in three dimensions. By bonding the flat surface of the outer circumference portion 6C and the facing surfaces of the outer circumference portion 33 and outer circumference portion 33A, the bonding area can be made larger.

Also, in the optical systems 220 and 270 in FIG. 2 and FIG. 7, the bonding locations can be reduced compared with the optical system 10 in FIG. 1 and the production process can be made simpler.

In the method of producing the optical lens of FIGS. 4A to 4C and FIGS. 5A and 5B, an optical lens 30 having a thickness of the substrate 34A at the outer circumference portion 33 greater than the thickness of the substrate 34A at the convex portion 31 can be produced.

Also, a surface vertical to the optical axis of the optical lens 30 can be formed at the outer circumference portion 33 of the optical lens 30. By making the upper surface of the outer circumference portion 33 of the optical lens vertical with respect to the optical axis of the optical lens 30, the skew adjustment between the optical lenses can be easily performed at the time of assembling the optical systems 220, 230, 270, and 280.

Optical Pickup

Figure 10:
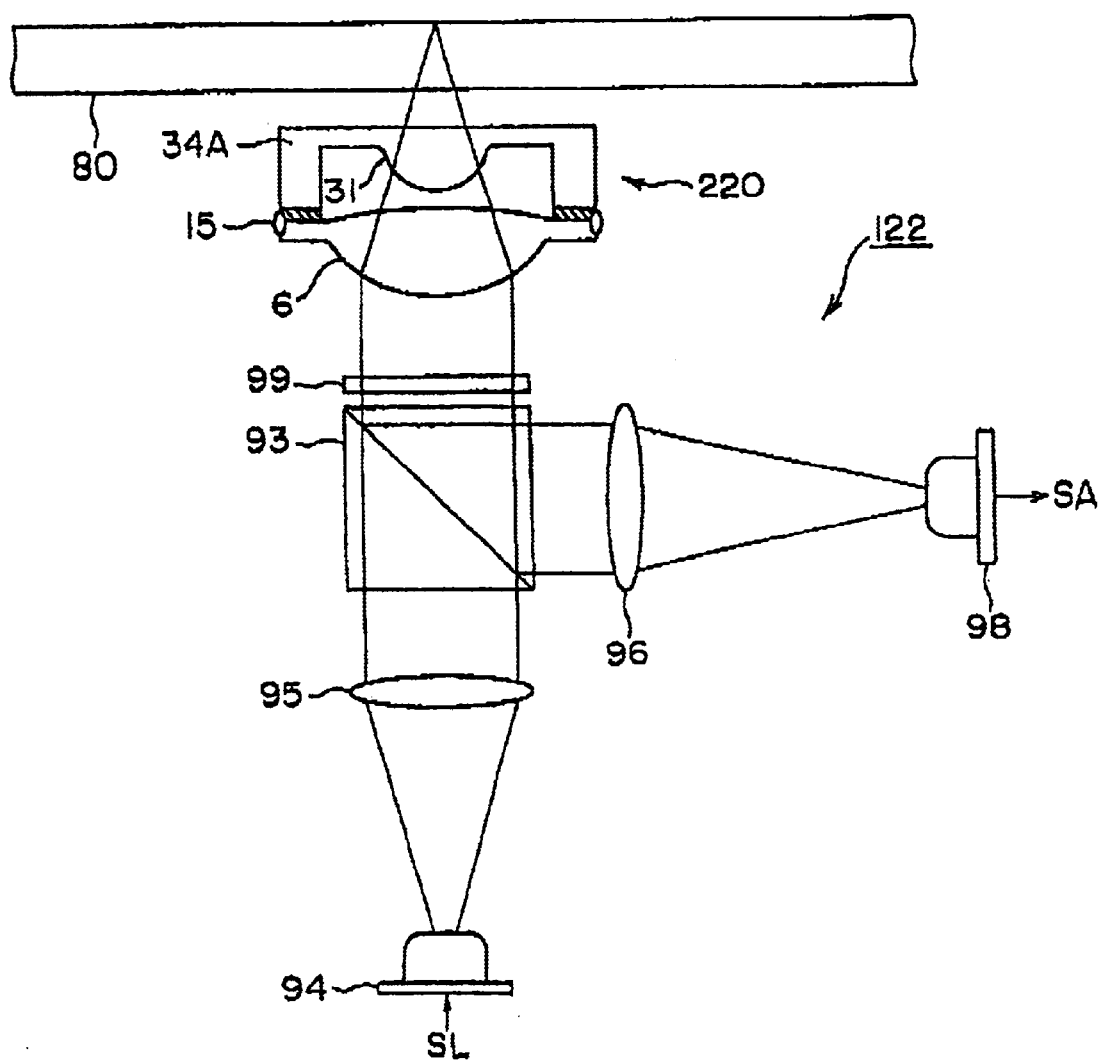
FIG. 10 is a schematic view of the configuration of a first embodiment of an optical pickup having an optical system according to the present invention.

FIG. 10 is a schematic view of the configuration of a first embodiment of an optical pickup according to the present invention.

The optical pickup 122 comprises a semiconductor laser 94, a collimater lens 95, a beam splitter 93, a ¼ wavelength plate (λ/4 plate) 99, a condensing lens 96, a photodetector 98, and an optical system 220. The optical system 220 may be configured as a slider attached to an arm and to move in the focal direction and tracking direction by a two-axis actuator.

The semiconductor laser 94 outputs laser light of straight polarized light based on a drive signal SL and supplies an output laser light to the collimater lens 95.

The collimater lens 95 converts the laser light from the semiconductor laser 94 to parallel light and supplies the same to the beam splitter 93.

The beam splitter 93 passes the laser light from the collimater lens 95 and supplies it to the optical lens 6 of the optical system 220 via the ¼ wavelength plate 99. The optical lens 6 passes the laser light from the ¼ wavelength plate 99 and supplies it to the convex portion 31. The convex portion 31 focuses the laser light passed through the optical lens 6 on the optical disk 80.

The optical lens 6 and the convex portion 31 serve as an object lens which focuses the laser light from the beam splitter 93 and supplies it to a track on the optical disk 80. In this way, the laser light from the semiconductor laser 94 is focused on the recording surface of the optical disk 80.

Also, the optical system 220 returns the laser light reflected at the optical disk 80 back to the beam splitter 93 via the ¼ wavelength plate 99.

The beam splitter 93 is struck by the laser light from the optical system 220, reflects the incident laser light, and supplies the same to the condensing lens 96.

The condensing lens 96 condenses the laser light from the beam splitter 93 and supplies it to the photodetector 98.

The photodetector 98 receives the laser light from the condensing lens 96 at the light receiving part and generates an output signal SA. The photodetector 98 is for example comprised of a quartering photodetector.

In the optical pickup 122 in FIG. 10, the resonance frequency can be raised by using the optical system 220 comparing with the optical pickup using the optical system 10 in FIG. 1. Thus, recording and/or reproduction of data at a high transfer rate becomes possible.

Figure 11:
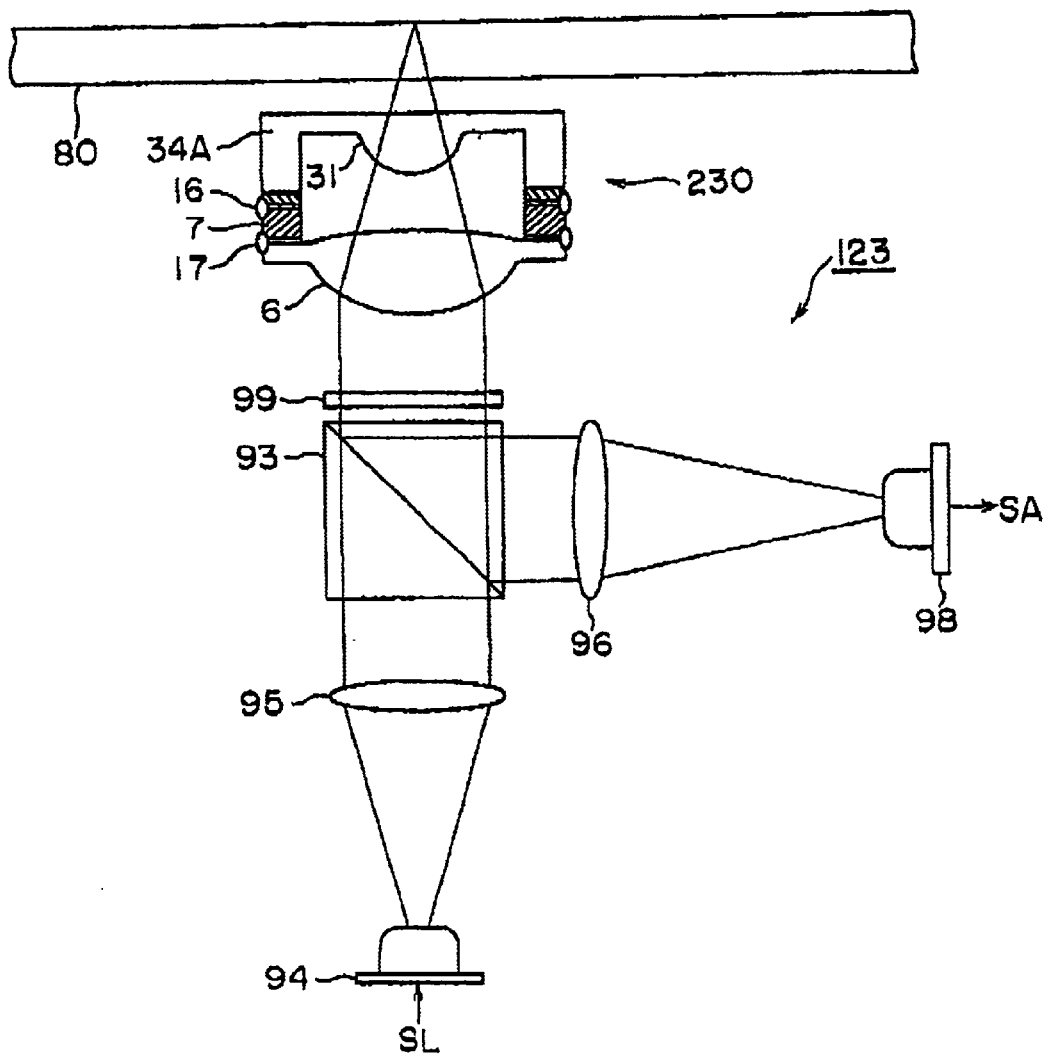
FIG. 11 is a schematic view of the configuration of a second embodiment of an optical pickup having an optical system according to the present invention.

FIG. 11 is a view of the configuration of a second embodiment of an optical pickup having an optical system according to the present invention.

The optical pickup 123 comprises a semiconductor laser 94, a collimater lens 95, a beam splitter 93, a ¼ wavelength plate (λ/4 plate) 99, a condensing lens 96, a photodetector 98, and an optical system 230. The optical system 230 may be configured as a slider attached to an arm and to move in the focal direction and tracking direction by a two-axis actuator.

The semiconductor laser 94 outputs laser light of straight polarized light based on a drive signal SL and supplies an output laser light to the collimater lens 95.

The collimater lens 95 converts the laser light from the semiconductor laser 94 to parallel light and supplies the same to the beam splitter 93.

The beam splitter 93 passes the laser light from the collimater lens 95 and supplies it to the optical lens 6 of the optical system 230 via the ¼ wavelength plate 99. The optical lens 6 passes the laser light from the ¼ wavelength plate 99 and supplies it to the convex portion 31. The convex portion 31 focuses the laser light passed through the optical lens 6 on the optical disk 80.

The optical lens 6 and the convex portion 31 have the function of an object lens which condenses the laser light from the beam splitter 93 and supplies it to a track on the optical disk 80. In this way, the laser light from the semiconductor laser 94 is focused on the recording surface of the optical disk 80.

Also, the optical system 230 returns the laser light reflected at the optical disk 80 back to the beam splitter 93 via the ¼ wavelength plate 99.

The beam splitter 93 is struck by the laser light from the optical system 230, reflects the incident laser light, and supplies the same to the condensing lens 96.

The condensing lens 96 condenses the laser light from the beam splitter 93 and supplies it to the photodetector 98.

The photodetector 98 receives the laser light from the condensing lens 96 at the light receiving part and generates an output signal SA. The photodetector 98 is for example comprised of a quartering photodetector.

In the optical pickup 123 in FIG. 11, the resonance frequency can be raised by using the optical system 230 comparing with the optical pickup using the optical system 10 in FIG. 1. Thus, recording and/or reproduction of data at a high transfer rate becomes possible.

Figure 12:
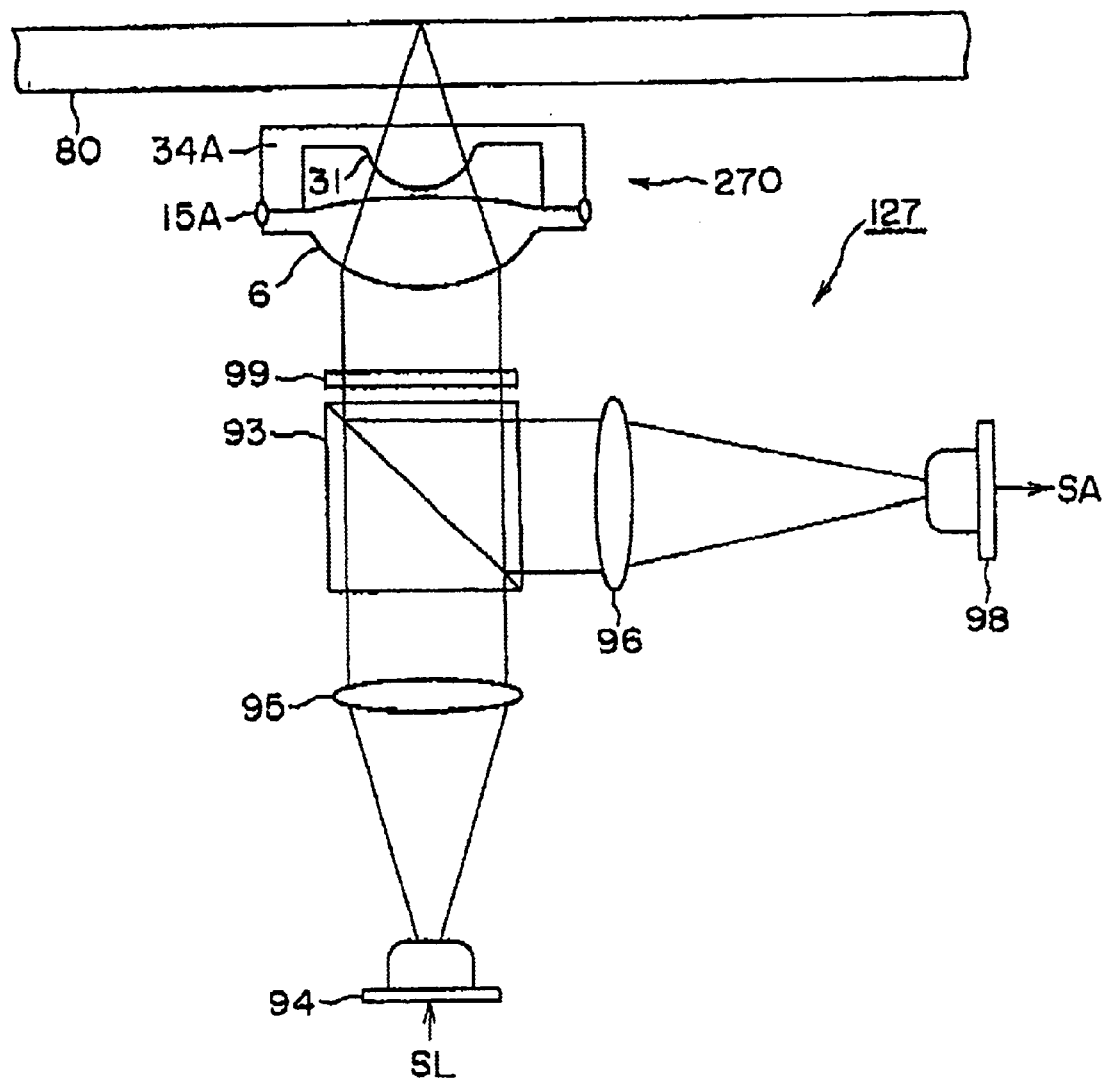
FIG. 12 is a schematic view of the configuration of a third embodiment of an optical pickup having an optical system according to the present invention.

FIG. 12 is a view of the configuration of a third embodiment of an optical pickup having an optical system according to the present invention.

The optical pickup 127 comprises a semiconductor laser 94, a collimater lens 95, a beam splitter 93, a ¼ wavelength plate (λ/4 plate) 99, a condensing lens 96, a photodetector 98, and an optical system 270. The optical system 270 may be configured as a slider attached to an arm and to move in the focal direction and tracking direction by a two-axis actuator.

The semiconductor laser 94 outputs laser light of straight polarized light based on a drive signal SL and supplies an output laser light to the collimater lens 95.

The collimater lens 95 converts the laser light from the semiconductor laser 94 to parallel light and supplies the same to the beam splitter 93.

The beam splitter 93 passes the laser light from the collimater lens 95 and supplies it to the optical lens 6 of the optical system 270 via the ¼ wavelength plate 99. The optical lens 6 passes the laser light from the ¼ wavelength plate 99 and supplies it to the convex portion 31. The convex portion 31 focuses the laser light passed through the optical lens 6 on the optical disk 80.

The optical lens 6 and the convex portion 31 have the function of an object lens which condenses the laser light from the beam splitter 93 and supplies it to a track on the optical disk 80. In this way, the laser light from the semiconductor laser 94 is focused on the recording surface of the optical disk 80.

Also, the optical system 270 returns the laser light reflected at the optical disk 80 back to the beam splitter 93 via the ¼ wavelength plate 99.

The beam splitter 93 is struck by the laser light from the optical system 270, reflects the incident laser light, and supplies the same to the condensing lens 96.

The condensing lens 96 condenses the laser light from the beam splitter 93 and supplies it to the photodetector 98.

The photodetector 98 receives the laser light from the condensing lens 96 at the light receiving part and generates an output signal SA. The photodetector 98 is for example comprised of a quartering photodetector.

In the optical pickup 127 in FIG. 12, the resonance frequency can be raised by using the optical system 270 comparing with the optical pickup using the optical system 10 in FIG. 1. Thus, recording and/or reproduction of data at a high transfer rate becomes possible.

Figure 13:
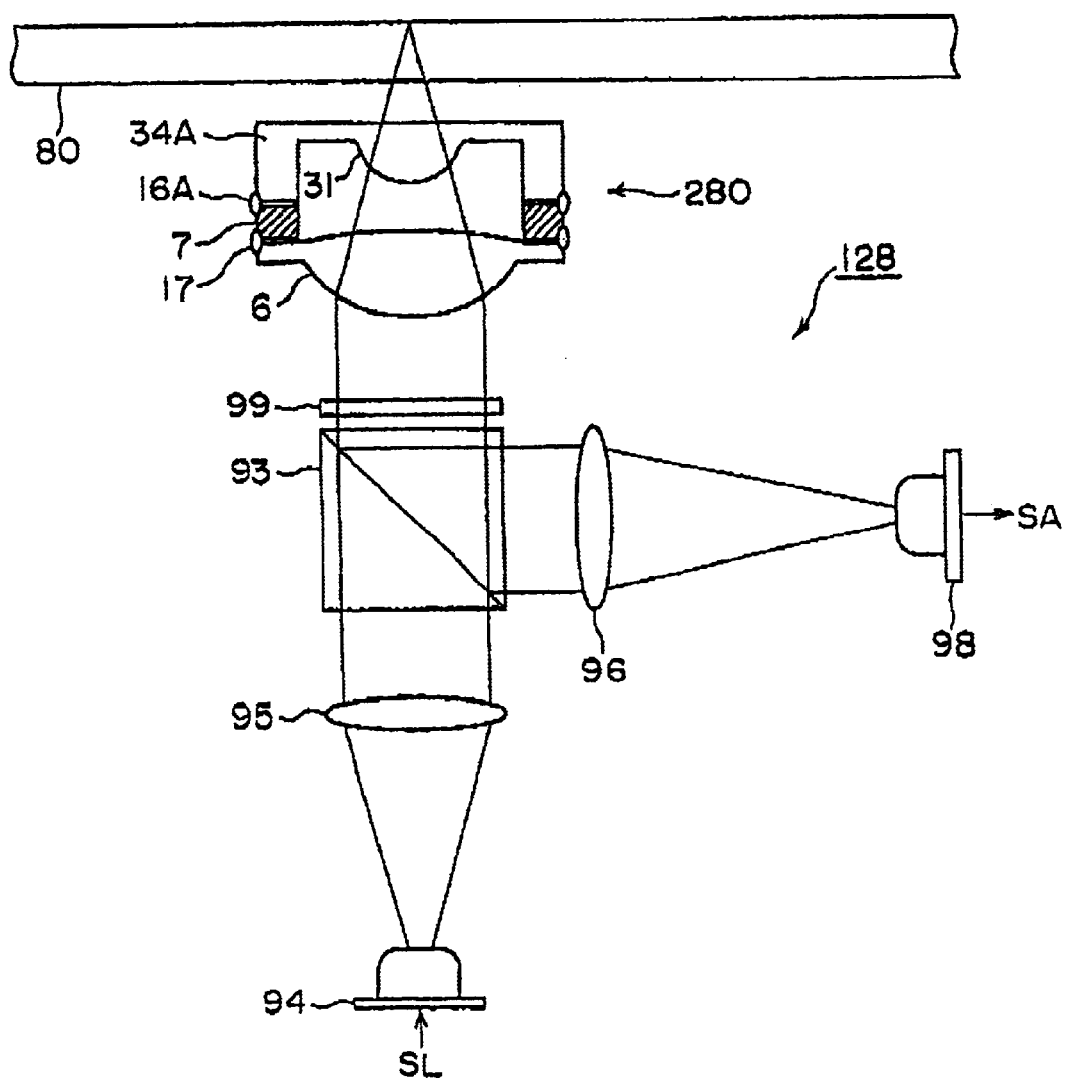
FIG. 13 is a schematic view of the configuration of a fourth embodiment of an optical pickup having an optical system according to the present invention.

FIG. 13 is a view of the configuration of a fourth embodiment of an optical pickup having an optical system according to the present invention.

The optical pickup 128 comprises a semiconductor laser 94, a collimater lens 95, a beam splitter 93, a ¼ wavelength plate (λ/4 plate) 99, a condensing lens 96, a photodetector 98, and an optical system 280. The optical system 280 may be configured as a slider attached to an arm and to move in the focal direction and tracking direction by a two-axis actuator.

The semiconductor laser 94 outputs laser light of straight polarized light based on a drive signal SL and supplies an output laser light to the collimater lens 95.

The collimater lens 95 converts the laser light from the semiconductor laser 94 to parallel light and supplies the same to the beam splitter 93.

The beam splitter 93 passes the laser light form the collimater lens 95 and supplies it to the optical lens 6 of the optical system 280 via the ¼ wavelength plate 99. The optical lens 6 passes the laser light from the ¼ wavelength plate 99 and supplies it to the convex portion 31. The convex portion 31 focuses the laser light passed through the optical lens 6 on the optical disk 80.

The optical lens 6 and the convex portion 31 have the function of an object lens which condenses the laser light from the beam splitter 93 and supplies it to a track on the optical disk 80. In this way, the laser light from the semiconductor laser 94 is focused on the recording surface of the optical disk 80.

Also, the optical system 280 returns the laser light reflected at the optical disk 80 back to the beam splitter 93 via the ¼ wavelength plate 99.

The beam splitter 93 is struck by the laser light from the optical system 280, reflects the incident laser light, and supplies the same to the condensing lens 96.

The condensing lens 96 condenses the laser light from the beam splitter 93 and supplies it to the photodetector 98.

The photodetector 98 receives the laser light from the condensing lens 96 at the light receiving part and generates an output signal SA. The photodetector 98 is for example comprised of a quartering photodetector.

In the optical pickup 128 in FIG. 13, the resonance frequency can be raised by using the optical system 280 comparing with the optical pickup using the optical system 10 in FIG. 1. Thus, recording and/or reproduction of data at a high transfer rate becomes possible.

Note that as the material for the substrates 34 and 34A, a glass material is more preferable than a plastic material. An optical system having a high NA is largely affected by color dispersion, so a glass material is more preferable particularly when the wavelength of the output light of the light source is blue or bluish purple.

Note that the embodiments explained above are just examples of the present invention, and the present invention is not limited to the above embodiments.

As explained above, according to the present invention, an optical system capable of reducing the trouble in assembly, a method of producing the optical system, and an optical pickup having the optical system can be provided.

Also, according to the present invention, an optical system capable of reducing the trouble in assembly and skew adjustment can be provided.

What is claimed is:

1. An optical system comprising first and second optical lenses arranged so as to have coinciding or substantially coinciding optical axes, wherein:
   said first optical lens has a substrate comprised of an optical material;
   said substrate has a convex portion serving as a convex lens and an outer circumference portion positioned around said convex portion;
   a thickness of said substrate at said outer circumference portion is greater than a thickness of said substrate at said convex portion;

said second optical lens has a first convex portion on one surface, and a second convex portion on another surface opposing said one surface; and the outer circumference portion of said first optical lens and an outer circumference portion of said second optical lens are fixed in place relative to each other so that said convex portion of said first optical lens faces said second optical lens.

2. An optical system as set forth in claim 1, wherein:

the outer circumference portion of said first optical lens faces the outer circumference portion of said second optical lens; and a facing surface of said outer circumference portion of said first optical lens and a facing surface of said outer circumference portion of said second optical lens are flat or approximately flat.

3. An optical system as set forth in claim 2, wherein:

a facing surface of said Outer circumference portion of said first optical lens is vertical or substantially vertical with respect to the optical axis of said first optical lens;

a facing surface of said outer circumference portion of said second optical lens is vertical or substantially vertical with respect to an optical axis of said second optical lens; and the facing surface of said outer circumference portion of said first optical lens and the facing surface of said outer circumference portion of said second optical lens are bonded together.

4. An optical system as set forth in claim 1, wherein:

said first optical lens further comprises a flat portion positioned around said convex portion;

said outer circumference portion is positioned around said flat portion; and a thickness of said substrate at said Outer circumference portion is greater than a thickness of said substrate at said flat portion.

5. An optical system as set forth in claim 1, wherein the outer circumference portion of said first optical lens and the outer circumference portion of said second optical lens are bonded together with an adhesive to opposite ends of a ring-shaped intermediate member so that said convex portion of said first optical lens faces said second optical lens.

6. An optical system as set forth in claim 1, wherein:

said outer circumference portion of said second optical lens is positioned around said first and second convex portions, and center axes of said first and second convex portions coincide or substantially coincide; and the outer circumference portion of said second optical lens and the outer circumference portion of said first optical tens are fixed in place relative to each other.

7. A method of producing an optical system having first and second optical lenses, wherein:

said first optical lens has a substrate comprised of an optical material;

said substrate has a convex portion serving as a convex lens and an outer circumference portion positioned around said convex portion, a thickness of said substrate at the outer circumference portion being greater than a thickness of said substrate at said convex portion; and said second optical lens has a first convex portion on one surface, and a second convex portion on another surface opposing said one surface;

comprising the step of bonding together with an adhesive said outer circumference portion of said first optical lens and an outer circumference portion of said second optical lens so that optical axes of said first and second optical lenses coincide or substantially coincide.

8. A method of producing an optical system as set forth in claim 7, further including the step of mounting the outer circumference portion of said second optical lens on said outer circumference portion of said first optical lens and positioning said first and second optical lenses so that said optical axes coincide or substantially coincide;

a mounting surface of said outer circumference portion of said first optical lens being flat or approximately flat; and a bottom surface of said outer circumference portion of said second optical lens being flat or approximately flat.

9. A method of producing an optical system as set forth in claim 8, wherein:

the mounting surface of said outer circumference portion of said first optical lens is vertical or substantially vertical with respect to the optical axis of said first optical lens; and the bottom surface of said outer circumference portion of said second optical lens is vertical or substantially vertical with respect to an optical axis of said second optical lens.

10. A method of producing an optical system having first and second optical lenses, wherein:

said first optical lens has a substrate comprised of an optical material; and said substrate has a convex portion serving as a convex lens and an outer circumference portion positioned around said convex portion, a thickness of said substrate at the outer circumference portion being greater than a thickness of said substrate at said convex portion;

comprising the step of bonding together said outer circumference portion of said first optical lens and an outer circumference portion of said second optical lens so that optical axes of said first and second optical lenses coincide or substantially coincide, wherein:

said first optical lens further comprises a flat portion positioned around said convex portion;

said outer circumference portion of said first optical lens is positioned around said flat portion;

a thickness of said substrate at said outer circumference portion of said first optical lens is greater than a thickness of said substrate at said flat portion; and said second optical lens has a first convex portion on one surface, and a second convex portion on another surface opposing said one surface.

11. A method of producing an optical system having first and second optical lenses, wherein:

said first optical lens has a substrate comprised of an optical material; and said substrate has a convex portion serving as a convex lens and an outer circumference portion positioned around said convex portion, a thickness of said substrate at the outer circumference portion being greater than a thickness of said substrate at said convex portion;

comprising the step of bonding together said outer circumference portion of said first optical lens and an outer circumference portion of said second optical lens so that optical axes of said first and second optical lenses coincide or substantially coincide, wherein said outer circumference portion of said first optical lens and said outer circumference portion of said second optical lens are bonded with an adhesive to opposite ends of a ring-shaped intermediate member so that the optical axes of said first and second optical lenses coincide or substantially coincide.

12. A method of producing an optical system having first and second optical lenses, wherein:

said first optical lens has a substrate comprised of an optical material; and said substrate has a convex portion serving as a convex lens and an outer circumference portion positioned around said convex portion, a thickness of said substrate at the outer circumference portion being greater than a thickness of said substrate at said convex portion;

comprising the step of bonding together said outer circumference portion of said first optical lens and an outer circumference portion of said second optical lens so that optical axes of said first and second optical lenses coincide or substantially coincide wherein said second optical lens has a first convex portion on one surface, a second convex portion on another surface opposing said one surface, and said outer circumference portion positioned around said first and second convex portions, and center axes of said first and second convex portions coinciding or substantially coinciding.

13. An optical pickup, comprising:

a laser;

an optical system for focusing laser light from said laser on an optical disk; and a photodetector for receiving said laser light reflected at said optical disk;

wherein:

said optical system comprises first and second optical lenses arranged so that their optical axes coincide or substantially coincide;

said second optical lens passes the laser light from said laser and supplies it to said first optical lens;

said first optical lens has a substrate comprised of an optical material;

said substrate has a convex portion for focusing laser light from second optical lens on said optical disk and an outer circumference portion positioned around said convex portion;

a thickness of said substrate at said outer circumference portion is greater than a thickness of said substrate at said convex portion; and the outer circumference portion of said first optical lens and an outer circumference portion of said second optical lens are fixed in place relative to each other so that said convex portion of said first optical lens faces said second optical lens.

14. An optical pickup as set forth in claim 13, wherein:

said outer circumference portion of said first optical lens faces the outer circumference portion of said second optical lens; and a facing surface of said outer circumference portion of said first optical lens and a facing surface of said outer circumference portion of said second optical lens are flat or approximately flat.

15. An optical pickup as set forth in claim 14, wherein:

a facing surface of said outer circumference portion of said first optical lens is vertical or substantially vertical with respect to the optical axis of said first optical lens;

a facing surface of said outer circumference portion of said second optical lens is vertical or substantially vertical with respect to an optical axis of said second optical lens; and the facing surface of said outer circumference portion of said first optical lens and the facing surface of said outer circumference portion of said second optical lens are bonded together.

16. An optical pickup as set forth in claim 13, wherein:

said first optical lens further comprises a flat portion positioned around said convex portion;

said outer circumference portion is positioned around said flat portion; and a thickness of said substrate at said outer circumference portion is greater than a thickness of said substrate at said flat portion.

17. An optical pickup as set forth in claim 13, wherein the outer circumference portion of said first optical lens and the outer circumference portion of said second optical lens are bonded via an intermediate member so that said convex portion of said first optical lens faces said second optical lens.

18. An optical pickup as set forth in claim 13, wherein:

said second optical lens has a first convex portion on one surface, a second convex portion on another surface opposing said one surface and an outer circumference portion positioned around said first and second convex portions, and center axes of said first and second convex portions coinciding or substantially coinciding, and the outer circumference portion of said second optical lens and the outer circumference portion of said first optical lens are bonded together.

* * * * *

UNITED STATES PATENT AND TRADEMARK OFFICE
CERTIFICATE OF CORRECTION

PATENT NO. : 6,747,811 B2
DATED : June 8, 2004
INVENTOR(S) : Koichiro Kishima

It is certified that error appears in the above-identified patent and that said Letters Patent is hereby corrected as shown below:

Column 17,
Lines 18 and 35, "Outer" should read -- outer --.

Column 18,
Line 13, "fiat" should read -- flat --.

Signed and Sealed this

First Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,747,811 B2
DATED : June 8, 2004
INVENTOR(S) : Koichiro Kishima

It is certified that error appears in the above-identified patent and that said Letters Patent is hereby corrected as shown below:

Column 17,
Line 52, "tens" should read -- lens --.

Signed and Sealed this

Third Day of May, 2005

JON W. DUDAS
*Director of the United States Patent and Trademark Office*